(12) United States Patent
Terashima et al.

(10) Patent No.: US 9,734,494 B2
(45) Date of Patent: Aug. 15, 2017

(54) POS SYSTEM AND PRINT DEVICE

(71) Applicant: Seiko Epson Corporation, Tokyo (JP)

(72) Inventors: Katsutoshi Terashima, Azumino (JP); Yoshihiro Ueno, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/665,206

(22) Filed: Mar. 23, 2015

(65) Prior Publication Data

US 2015/0287013 A1 Oct. 8, 2015

(30) Foreign Application Priority Data

Apr. 7, 2014 (JP) ................................. 2014-078421

(51) Int. Cl.
| | | |
|---|---|---|
| *G06K 15/00* | (2006.01) | |
| *G06Q 20/20* | (2012.01) | |
| *G07G 5/00* | (2006.01) | |
| *G07G 1/00* | (2006.01) | |

(52) U.S. Cl.
CPC ......... *G06Q 20/209* (2013.01); *G06Q 20/206* (2013.01); *G07G 1/0045* (2013.01); *G07G 5/00* (2013.01)

(58) Field of Classification Search
CPC .. G06Q 20/209; G06Q 20/206; G07G 1/0045; G07G 5/00
USPC .......................................... 235/375, 380, 383
See application file for complete search history.

(56) References Cited

U.S. PATENT DOCUMENTS

| | | | | |
|---|---|---|---|---|
| 4,722,054 | A * | 1/1988 | Yorozu ................ | G06Q 20/204 235/379 |
| 5,023,436 | A * | 6/1991 | Takada .................. | G06K 7/084 235/375 |
| 8,441,666 | B2 * | 5/2013 | Tomii ..................... | G06F 3/121 358/1.1 |
| 8,561,890 | B2 * | 10/2013 | Godager ............... | G06Q 30/00 235/375 |
| 2001/0045459 | A1* | 11/2001 | Kondo .................. | G06K 15/00 235/383 |
| 2004/0041022 | A1* | 3/2004 | Minowa ................ | G06Q 30/02 235/383 |
| 2004/0105126 | A1* | 6/2004 | Minowa ................ | B42D 15/00 358/1.18 |
| 2005/0240482 | A1* | 10/2005 | Ohkawa ............... | G06Q 20/045 705/24 |
| 2005/0242178 | A1* | 11/2005 | Minowa ............. | G06Q 30/0225 235/383 |

(Continued)

FOREIGN PATENT DOCUMENTS

| | | |
|---|---|---|
| EP | 2680243 A1 | 1/2014 |
| JP | 2009-251982 | 10/2009 |

(Continued)

*Primary Examiner* — Paultep Savusdiphol
(74) *Attorney, Agent, or Firm* — Foley & Lardner LLP

(57) ABSTRACT

A POS system 1 includes a reading device 15 that reads and outputs member information; a POS terminal 8 that executes a transaction process and outputs receipt print data based on the transaction process; and a print control device 12. The print control device 12 has a device communication unit 39 that receives the member information; a communication interface 35 that receives the receipt print data; a storage unit 38 that stores the member information received by the device communication unit 39; and a network communication unit 37 that transmits first data relating the member information and the receipt print data.

16 Claims, 4 Drawing Sheets

(56) References Cited

U.S. PATENT DOCUMENTS

| | | | | |
|---|---|---|---|---|
| 2005/0247781 A1* | 11/2005 | Minowa | G06Q 30/02 | 235/383 |
| 2006/0055950 A1* | 3/2006 | Sugimoto | B41J 11/008 | 358/1.12 |
| 2006/0232619 A1* | 10/2006 | Otsuka | G06K 15/00 | 347/5 |
| 2008/0144100 A1* | 6/2008 | Tomii | G06F 3/121 | 358/1.15 |
| 2009/0006151 A1* | 1/2009 | Zarghami | G06Q 10/06375 | 705/7.31 |
| 2009/0066996 A1* | 3/2009 | Minowa | B41J 3/54 | 358/1.15 |
| 2010/0268630 A1* | 10/2010 | Holmen | G06Q 40/00 | 705/35 |
| 2011/0034155 A1 | 2/2011 | Kamamoto | | |
| 2012/0057184 A1* | 3/2012 | Furuhata | G06F 3/1205 | 358/1.13 |
| 2012/0069404 A1* | 3/2012 | Kodama | G06F 3/1206 | 358/1.18 |
| 2012/0185306 A1* | 7/2012 | Cheng | G06Q 20/209 | 705/14.4 |
| 2012/0290420 A1* | 11/2012 | Close | G06Q 20/20 | 705/17 |
| 2013/0132282 A1* | 5/2013 | Shakkarwar | G06Q 20/382 | 705/64 |
| 2013/0314727 A1* | 11/2013 | Furuhata | G06F 3/1205 | 358/1.6 |
| 2013/0321845 A1* | 12/2013 | Takamoto | G06F 3/1206 | 358/1.13 |
| 2014/0122275 A1* | 5/2014 | Argue | G06Q 20/0453 | 705/24 |
| 2014/0122276 A1* | 5/2014 | Argue | G06Q 20/0453 | 705/24 |
| 2014/0319206 A1* | 10/2014 | Chakra | G06Q 30/00 | 235/375 |
| 2015/0002896 A1 | 1/2015 | Takasu et al. | | |

FOREIGN PATENT DOCUMENTS

| | | |
|---|---|---|
| JP | 2011-039739 | 2/2011 |
| JP | 2012-185664 | 9/2012 |
| JP | 2013-222226 | 10/2013 |
| JP | 2014-038443 | 2/2014 |
| WO | 2013132809 A1 | 9/2013 |

\* cited by examiner

POS SYSTEM AND PRINT DEVICE

Priority is claimed under 35 U.S.C. §119 to Japanese Application no. 2014-078421 filed on Apr. 7, 2014 which is hereby incorporated by reference in their entirety.

BACKGROUND

1. Technical Field

The present disclosure relates to a POS system having a POS terminal, and to a print control device used in the POS system.

2. Related Art

Systems for reading member information with a card reader/writer connected to a POS terminal, and producing electronic receipts using the information that was read are known from the literature. See, for example, JP-A-2013-222226.

To execute a process based on identification information (member information) captured by a reading device such as a card reader/writer in the system described in JP-A-2013-222226, the POS terminal must be able to communicate with the reading device and process the identification information input from the reading device, and a POS terminal without this ability cannot be used to execute a process based on the read identification information.

SUMMARY

A POS system, and a print control device used in a POS system, according to the invention enable executing a process based on identification information read by a reading device without providing the POS terminal with the ability to communicate with a reading device and process identification information.

A POS system according to one aspect of the invention includes: a reading device that reads and transmits identification information; a POS terminal that executes a transaction process and transmits print information based on the transaction process; and a print control device including a first reception unit that receives the identification information, a second reception unit that receives the print information, a storage unit that stores the identification information received by the first reception unit, and a transmission unit that relationally transmits the identification information and the print information.

Thus comprised, the print control device that communicates with the POS terminal receives identification information from the reading device and executes an appropriate process. The POS system can therefore execute processes based on identification information read by a reading device without providing the POS terminal with a function for communicating with the reading device and processing identification information.

The POS system preferably also has: a management device including a communication unit that receives the identification information and the print information relationally transmitted by the transmission unit of the print control device, and a control unit that executes a process based on the related identification information and print information received by the communication unit.

Thus comprised, the management device can execute a process using the identification information and print information based on the received identification information and print information.

In a POS system according to another aspect of the invention, the print control device has an identification information process unit that receives a specific signal, and deletes the identification information stored in the storage unit when the specific signal is received.

Thus comprised, identification information stored in the print control device can be deleted and transmission of the identification information by the print control device can be cancelled by sending a specific signal to the print control device.

In a POS system according to another aspect of the invention, the reading device transmits the specific signal; and the specific signal is received by the first reception unit of the print control device.

Thus comprised, identification information stored in the print control device can be deleted and transmission of the identification information by the print control device can be cancelled by sending a specific signal from the reading device to the print control device.

In a POS system according to another aspect of the invention, the print control device has a print unit that prints based on the print information.

Thus comprised, it is sufficient to add a function for communicating with the reading device and processing identification information to the print control device, which is a device that prints based on the print information, and there is no need to add a dedicated device with this function to the POS system.

In a POS system according to another aspect of the invention, the print control device has a signal transmission unit that transmits a wireless signal based on reception of the print information; and the POS system includes a terminal that receives the signal transmitted by the signal transmission unit.

Thus comprised, the terminal 14 can execute a specific process triggered by receiving the beacon signal.

Another aspect of the invention is a print control device including: a first reception unit that receives identification information; a second reception unit that receives print information; a storage unit that stores the identification information received by the first reception unit; and a transmission unit that relationally transmits the identification information and the print information.

By adding a print control device according to this aspect of the invention to a POS system, the POS system can execute processes based on identification information read by a reading device without providing the POS terminal with a function for communicating with the reading device and processing identification information.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
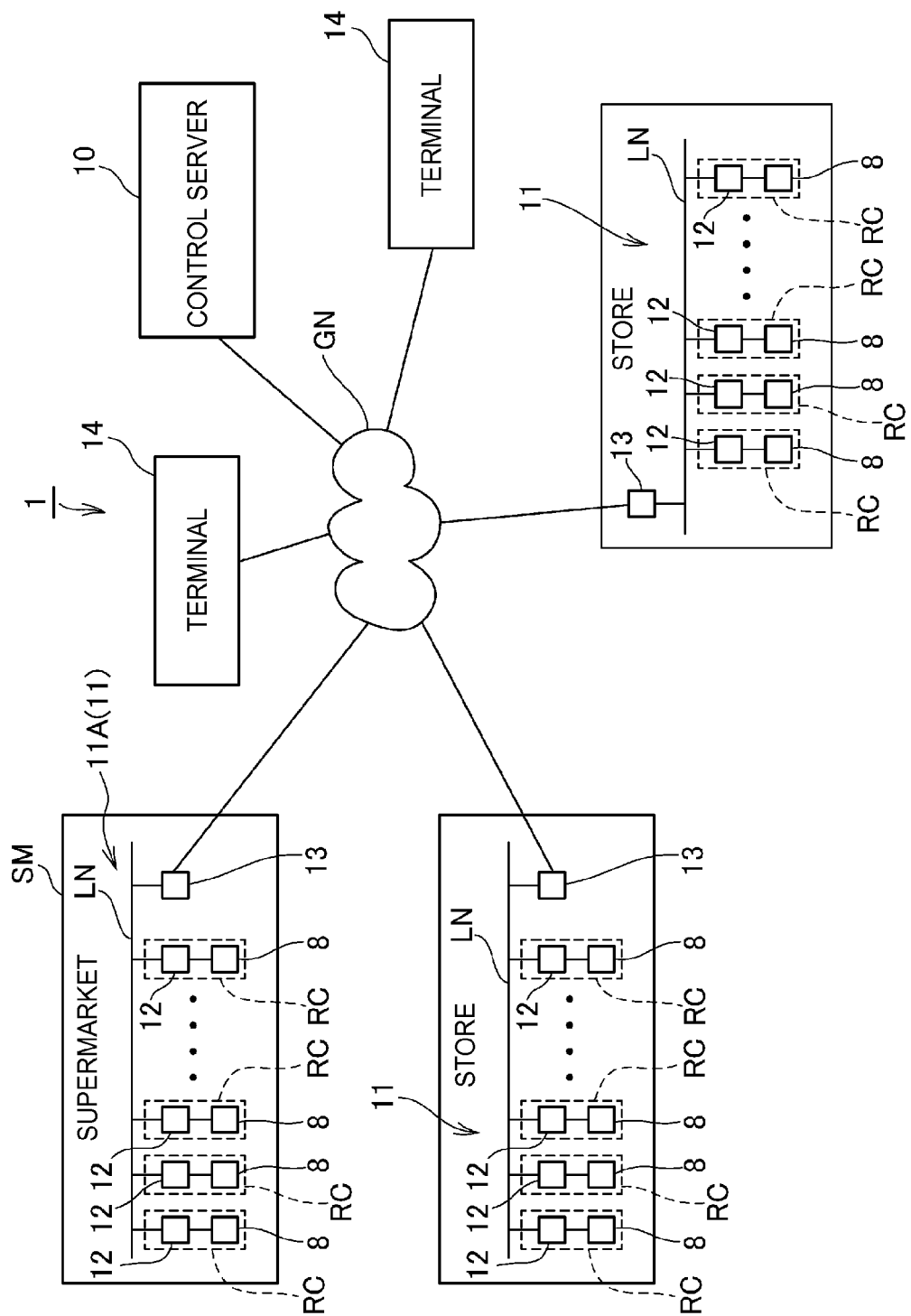
FIG. 1 shows the configuration of a POS system according to an embodiment of the invention.

FIG. 1 shows the configuration of a POS system 1 according to this embodiment of the invention.

As shown in FIG. 1, the POS (point-of-sale) system 1 includes a management server 10 (management device). A plurality of store systems 11 connect to the management server 10 through the Internet or other network GN, or GN.

The store system 11 is a system that is used in retail businesses such as supermarkets, convenience stores, department stores, and restaurants. The store system 11 has functions including producing receipts for customers that completed a transaction at the store.

The store system 11 has one or more print control devices 12 capable of producing receipts. The print control devices 12 are connected to a local area network LN deployed in the store. A network communication controller 13 configured with a communication device such as a network router or modem connects to the local area network LN. The print control devices 12 access the network GN through the network communication controller 13.

The print control device 12 connects to a POS terminal 8 in the store system 11. A POS application and printer driver are installed on the POS terminal 8. While described in further detail below, the 8 controls the print control devices 12 and produces receipts with the print control devices 12 through a POS application and a printer driver.

One or a plurality of checkout counters RC are set up in the store. A print control device 12, and a POS terminal 8 that connects to the print control device 12.

In the example shown in FIG. 1, the store system 11A is a system used in a supermarket SM. Plural checkout counters RC are set up in the supermarket SM. A print control device 12 and a POS terminal 8 are installed at each checkout counter RC. Customers shopping and buying products in the supermarket SM complete the transaction at the checkout counter RC. The POS terminal 8 executes a payment process according to the transaction, and sends receipt print data instructing printing receipt information based on the transaction to the print control device 12. The print control device 12 then produces a receipt based on the received receipt print data. The printed receipt is then given to the customer.

A terminal 14 also connects to the network GN. The terminal 14 is a cell phone with a touch panel (such as a smartphone) belonging to the customer. The terminal 14 simply needs the ability to execute the process described below, and a tablet computer or a notebook computer, for example, can be used as the terminal 14.

Figure 2:
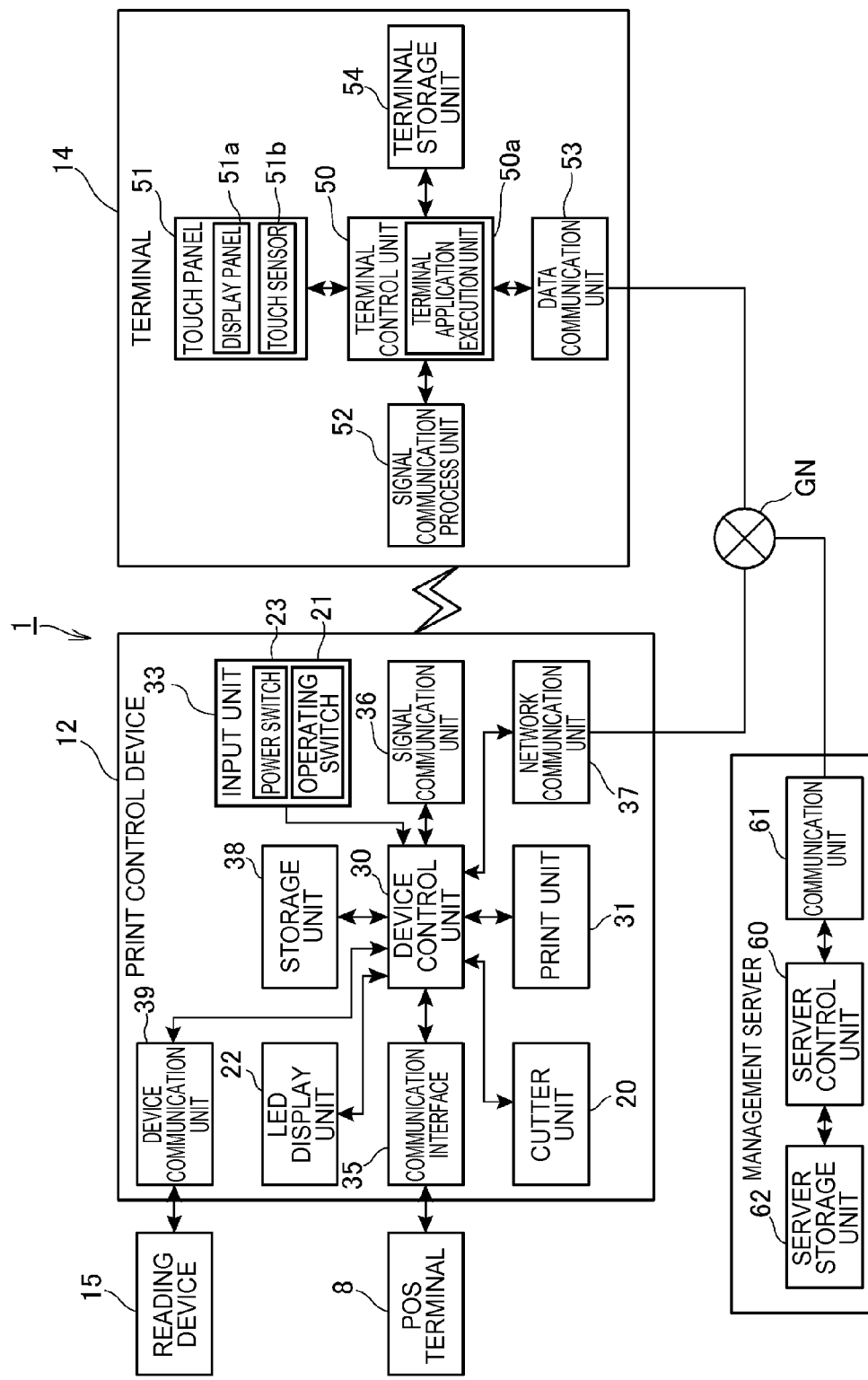
FIG. 2 is a block diagram showing the functional configuration the POS system.

FIG. 2 is a block diagram showing the functional configuration of the POS system 1.

As shown in FIG. 2, the POS system 1 includes a POS terminal 8, a print control device 12, a reading device 15, a terminal 14, and a management server 10.

As shown in FIG. 2, the print control device 12 includes a device control unit 30, a print unit 31, a cutter unit 20, an LED display unit 22, an input unit 33, a communication interface 35 (second reception unit), a signal communication unit 36 (signal transmission unit), a network communication unit (transmission unit) 37, a storage unit 38, and a device communication unit 39 (first reception unit).

The device control unit 30 includes a CPU, ROM, RAM, and other peripheral circuits, and controls the print control device 12. The device control unit 30 controls the print control device 12 by reading and running firmware stored in ROM, for example.

The print unit 31 includes a thermal head, a roll paper R conveyance mechanism, and other mechanisms and devices related to printing on the roll paper R, and forms dots and prints on the roll paper R as controlled by the device control unit 30.

The input unit 33 detects operation of an operating switch 21 and power switch 23 disposed to the print control device 12, and outputs to the device control unit 30.

The communication interface 35 communicates with the POS terminal 8 according to a specific communication protocol as controlled by the device control unit 30.

The signal communication unit 36 includes an antenna, and a signal processing circuit for encoding, decoding, modulating, and demodulating data that is sent and received by radio communication. The signal communication unit 36 has a function for wirelessly transmitting a beacon signal as controlled by the device control unit 30. The signal communication unit 36 transmits a beacon signal containing the information described below at the specific timing described below as controlled by the device control unit 30.

The network communication unit 37 communicates with other devices (such as the management server 10) connected to the network GN through the network GN according to a specific communication protocol as controlled by the device control unit 30.

The storage unit 38 includes nonvolatile memory, and stores data.

The device communication unit 39 communicates with the reading device 15 as a device as controlled by the device control unit 30.

As shown in FIG. 2, the reading device 15 is an IC card reader for reading contactless IC cards. The reading device 15 communicates by near-field communication according to a specific communication protocol with the IC card to read the IC card and acquire information stored on the IC card. Below, the information the reading device 15 reads and acquires from an IC card is called "read information."

As shown in FIG. 2, the terminal 14 includes a terminal control unit 50, a touch panel 51, a wireless communication unit 52, a data communication unit 53, and a terminal storage unit 54.

The terminal control unit 50 includes a CPU, ROM, RAM, and other peripheral circuits and controls the terminal 14.

The touch panel 51 includes a display panel 51a disposed to the front of the terminal 14, and a touch sensor 51b disposed over the display panel 51a. The display panel 51a is a display such as an LCD panel or OLED panel. The touch sensor 51b is a capacitive or pressure sensitive sensor, detects the operator's touch operations with a finger or stylus, and outputs to the terminal control unit 50.

The wireless communication unit 52 receives a beacon signal transmitted by the print control device 12 as controlled by the terminal control unit 50.

The data communication unit 53 communicates with devices connected to the network GN (such as the management server 10) through the network GN according to a specific communication protocol as controlled by the terminal control unit 50.

The terminal storage unit 54 includes nonvolatile memory and stores data.

A specific application (referred to below as a terminal application AP) is preinstalled to the terminal 14. This terminal application AP is software with a function for controlling the print control device 12, a function for communicating with the print control device 12, and other functions related to the print control device 12. The terminal control unit 50 of the terminal 14 includes a terminal application execution unit 50*a* that runs the terminal application AP and executes processes.

The management server 10 is a server device that connects to the network GN, and includes a server control unit 60 (control unit), a communication unit 61, and a server storage unit 62.

The server control unit 60 includes CPU, ROM, RAM, and other peripheral circuits, and controls the management server 10.

The communication unit 61 communicates with devices connected to the network GN through the network GN according to a specific communication protocol as controlled by the server control unit 60.

The server storage unit 62 is nonvolatile memory and stores data.

Processes executed by the reading device 15 and print control device 12 are described next.

Figure 3:
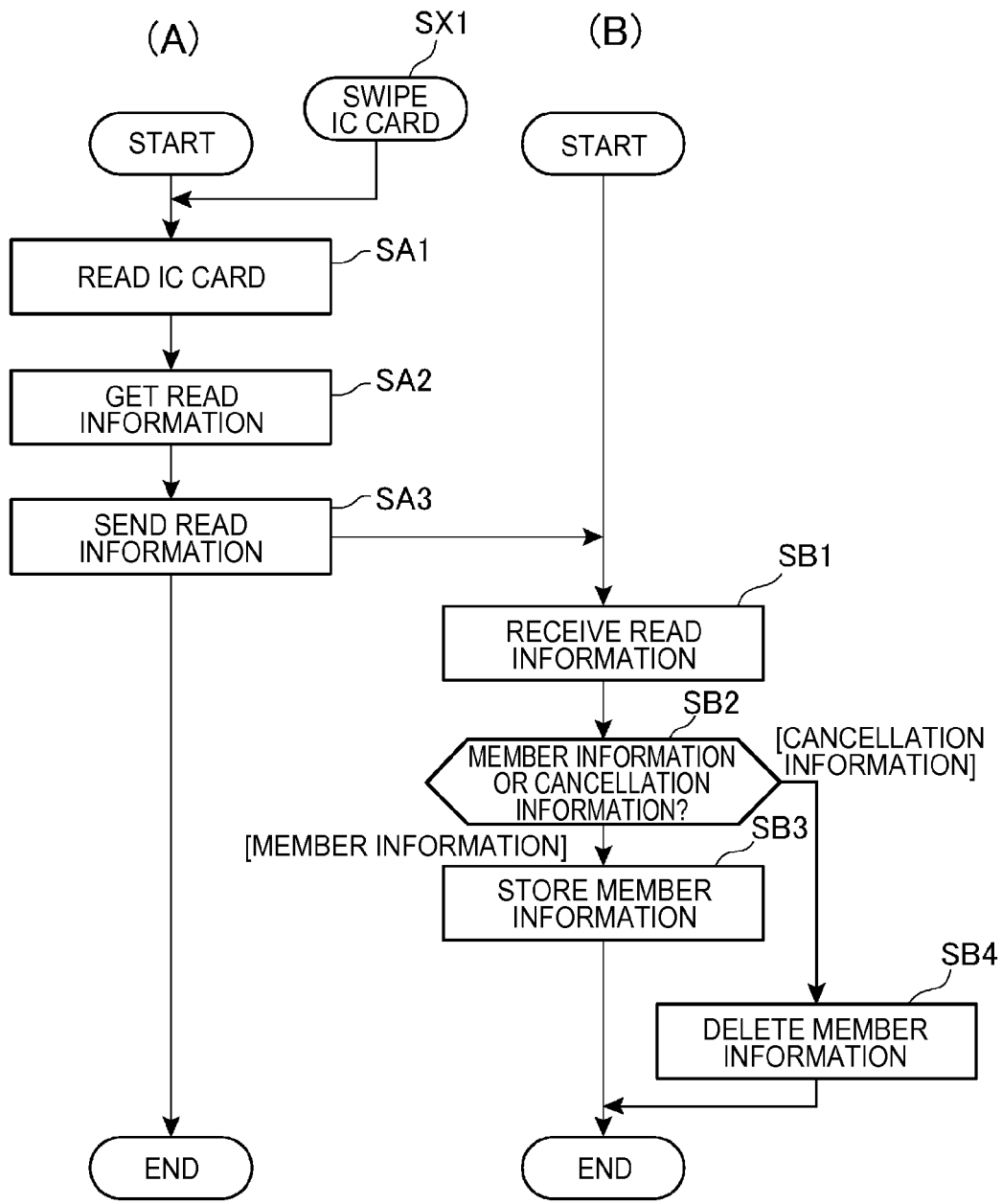
FIG. 3 is a flow chart showing the operation of a reading device and a print control device.

FIG. 3 is a flow chart illustrating the operation of the reading device 15 and the print control device 12 when information is read by the reading device 15. FIG. 3(A) shows the operation of the reading device 15, and (B) shows the operation of the print control device 12.

In the operation described below with reference to FIG. 3, the device control unit 30 functions as an identification information process unit.

As shown in FIG. 3(A), when an IC card compatible with the specific communication protocol is in proximity to the antenna of the reading device 15 (step SX1), the reading device 15 executes the following process. The reading device 15 reads information stored on the IC card according to a specific communication protocol (step SA1), and acquires the read information (step SA2).

In this embodiment, the IC card may be a member card C1 belonging to the customer in the transaction at the checkout counter RC, or a cancellation card C2 that is read to cause the print control device 12 to execute the process described below. Member information (identification information) that identifies a customer as a member is stored on the member card C1. Cancellation information of a value different from the member information is stored on the cancellation card C2.

Next, the reading device 15 sends the acquired read information to the print control device 12 (step SA3).

When the read information is cancellation information, the process of step SA3 is equivalent to a process of the reading device 15 sending a specific signal.

As shown in FIG. 3(B), the device control unit 30 of the print control device 12 controls the device communication unit 39 and receives the read information (step SB1).

Next, the device control unit 30 determines whether the read information that was received is member information or cancellation information (step SB2). Note that the device control unit 30 manages the cancellation information values, and can determine if the received read information is member information or cancellation information.

If the read information is member information (step SB2: MEMBER INFORMATION), the device control unit 30 stores the member information in a specific storage area (step SB3). In this embodiment, the specific storage area is a storage area reserved in the storage unit 38. The specific storage area may be a storage area formed in a storage medium other than the storage unit 38.

However, if the read information is cancellation information (step SB2: CANCELLATION INFORMATION), the device control unit 30 deletes the member information stored in the specific storage area (step SB4).

As described above, this embodiment of the invention can delete member information stored in the print control device 12 by reading a cancellation card C2 with the reading device 15. The member information stored in the print control device 12 can therefore be deleted by reading the cancellation card C2 with the reading device 15 in the event a member card C1 is mistakenly read and the member information stored on the member card C1 is stored in the print control device 12. Transmission of member information stored on a mistakenly read member card C1 from the print control device 12 to the management server 10 can therefore be prevented as described below.

As described above, the POS system 1 produces a printed receipt on the print medium according to the transaction of a customer of the business. In addition to printing paper receipts, the POS system 1 according to this embodiment can also issue an electronic receipt to a customer completing a transaction.

The operation of devices in the POS system 1 is described below.

Figure 4:
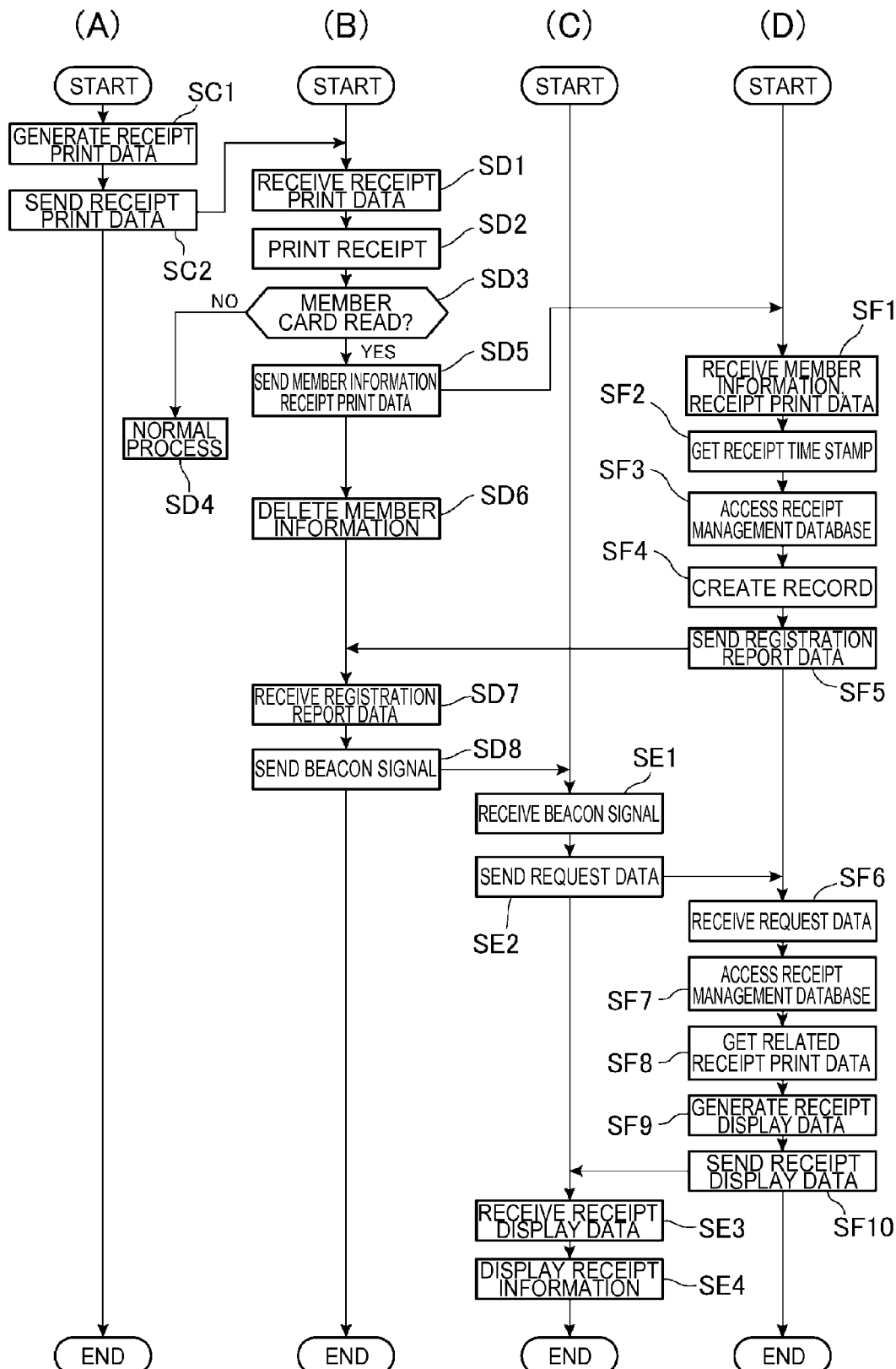
FIG. 4 is a flow chart showing the operation of devices in the POS system.

FIG. 4 is a flow chart showing the operation of devices in the POS system 1, (A) showing the operation of the POS terminal 8, (B) showing the operation of the print control device 12, (C) showing the operation of the terminal 14, and (D) showing the operation of the management server 10.

In FIG. 4, the terminal 14 is used by the customer in a transaction, and the print control device 12 is disposed to the checkout counter RC where the customer performs the transaction. Therefore, while the customer is performing the transaction, that is, while the customer is at the checkout counter RC, the terminal 14 is close enough to the print control device 12 that it can receive the beacon signal the print control device 12 transmits wirelessly.

Note that the following description using FIG. 4 is based on the terminal application AP already running on the terminal 14.

As shown in FIG. 4(A), the POS terminal 8 executes a payment process appropriately to the customer transaction, and generates receipt print data based on the payment process (step SC1). The receipt print data is also referred to as the printing information.

More specifically, the function blocks of the POS terminal 8 include a POS application execution unit that runs a POS application, and a printer driver execution unit that runs a printer driver.

The POS application execution unit generates receipt information including the information to print on a receipt according to the customer transaction. The receipt information is information including, for example, a logo printed on the receipt; when the receipt is printed; the names, prices, and quantities of the products the customer purchased; tax-related information; the subtotal; the amount received from the customer; the amount of change due; or other information. While not shown in the figures, a barcode reader that read barcodes from products or product packaging, and a card reader that reads cards such as customer member cards, are connected to the POS terminal 8. When processing a transaction for a customer of the business, the POS application execution unit gets required information from product master and customer master databases and generates the receipt information based on input from the barcode reader, the card reader, or input by the checkout clerk through a keypad or other input means.

After generating the receipt information, the printer driver execution unit generates receipt print data, which is control data based on the command language of the print control device 12, instructing printing the receipt information.

Next, the POS terminal 8 sends the generated receipt print data to the print control device 12 (step SC2).

As shown in FIG. 4(B), the device control unit 30 of the print control device 12 controls the communication interface 35 to receive the receipt print data (step SD1).

Next, the device control unit 30 controls the print unit 31 and cutter unit 20, for example, based on the receipt print data to print the receipt information on the roll paper R and produce a receipt (step SD2).

Next, the device control unit 30 determines if a member card C1 was read by the reading device 15 within a specific time (step SD3). As described above, when a member card C1 is read with the reading device 15, the reading device 15 sends the read information to the print control device 12. If the read information that is received is member information, the device control unit 30 of the print control device 12 stores the member information in the specific storage area.

A customer having a member card and desiring an electronic receipt swipes the member card C1 over the reading device 15 connected to the print control device 12 at the checkout counter RC during the transaction to read the member card. The reading device 15 is therefore installed at a location easily accessible by the customer.

In step SD3, the device control unit 30 determines whether or not a member card C1 is read by the reading device 15 (whether or not the customer swipes the member card C1) within a specific time.

This specific time is, for example, the time between when a receipt based on the print control data from the last transaction was produced and when print control data is received in step SD1. If a member card C1 is read by the reading device 15 during this period, and the cancellation card C2 is not read after the member card C1 was read, the member information is stored in the specific storage area. The device control unit 30 can therefore determine in step SD3 whether or not a member card C1 was read by the reading device 15 during the specific period by determining whether or not member information is stored in the specific storage area.

The start and end of this specific time may alternatively be set by the checkout clerk operating a specific operating switch, for example. In this configuration, the member information stored in the member card C1 is not stored in the specific storage area if the member card C1 is read outside of this specific period. In step SD3, the device control unit 30 then determines whether or not member information is stored in the specific storage area, and determines whether or not a member card C1 is read by the reading device 15 within the specific period.

If it is determined in step SD3 that a member card C1 was not read within the specific period (step SD3 returns NO), the device control unit 30 executes the normal process (step SD4). Description of the process executed in step SD4 is omitted.

If it is determined in step SD3 that a member card C1 was read within the specific period (step SD3 returns YES), the device control unit 30 executes the process described below (step SD5). Note that in this event the member information stored on the member card C1 that was read is stored in the specific storage area.

In step SD5 the device control unit 30 controls the network communication unit 37 to send the receipt print data received in step SD1 and first data related to the member information stored in the specific storage area to the management server 10.

Note that information required for communication with the management server 10, such as the address of the management server 10, is stored in the print control device 12. In step SD5, the device control unit 30 controls the network communication unit 37 to establish a connection with the management server 10, and sends the first data through the connection.

Next, the device control unit 30 deletes the member information stored in the specific storage area (step SD6).

As shown in FIG. 4 (D), the server control unit 60 of the management server 10 controls the communication unit 61 to receive the member information and the first data related to the receipt print data (step SF1).

Next, the server control unit 60 gets the receipt time stamp information (step SF2). The receipt time stamp identifies when the receipt (the receipt printed by the process in step SD2) based on the corresponding receipt print data was printed. For example, the server control unit 60 may acquire the date and time the first data was received in step SF1 as the receipt time stamp. Further alternatively, if information indicating when the receipt is printed is contained in the receipt print data, the server control unit 60 may extract that information and use the date/time the information indicates as the receipt time stamp.

Next, the server control unit 60 accesses a receipt management database DB1 (step SF3).

The receipt management database DB1 is a database relationally storing the member information, receipt time stamp, and receipt print data.

Next, the server control unit 60 creates one record in the receipt management database DB1, and stores the member information received in step SF1, the receipt time stamp acquired in step SF2, and the receipt print data acquired in step SF1 in the created record (step SF4).

Next, the server control unit 60 generates registration report data reporting that creation of the record in the receipt management database DB1 was completed, and controls the communication unit 61 to send the registration report data to the print control device 12 (step SF5).

In step SF5, the server control unit 60 sends the registration report data through the connection established with the print control device 12.

As shown in FIG. 4(B), the device control unit 30 of the print control device 12 controls the network communication unit 37 to receive the registration report data (step SD7).

Next, the device control unit 30 controls the signal communication unit 36 to send the beacon signal wirelessly (step SD8).

As shown in FIG. 4(C), the terminal application execution unit 50a of the terminal control unit 50 of the terminal 14 then controls the wireless communication unit 52 to receive the beacon signal (step SE1).

Next, the terminal application execution unit 50a creates request data including the member information and requesting providing an electronic receipt, and controls the data communication unit 53 to send the request to the management server 10 (step SE2).

Note that the terminal application execution unit 50a manages the member information. For example, the terminal application execution unit 50a may manage the member information by providing a user interface with a field for inputting member information to the customer, and storing the member information input through the user interface to the specific storage area.

Information used to communicate with the management server 10, including the address of the management server 10, is previously stored in the terminal 14. In step SE2, the terminal application execution unit 50a controls the data communication unit 53 to open a connection with the management server 10 and send the requested data through the connection.

As shown in FIG. 4(D), the server control unit 60 of the management server 10 controls the communication unit 61 to receive the request data (step SF6).

Next, the server control unit 60 accesses the receipt management database DB1 (step SF7).

Next, the server control unit 60 acquires the receipt print data related to the member information from the receipt management database DB1 using the member information contained in the request data received in step SF6 as the search key (step SF8).

Note that if there are plural receipt print data records related to the same member information, the server control unit 60 gets the receipt print data with the receipt time stamp that is closest to the current time.

Next, the server control unit 60 generates receipt display data based on the receipt print data acquired in step SF8 (step SF9). The receipt display data is a display file in a specific format for displaying the receipt information. The specific file format may be a file in a markup language such as HTML or XML, or a PDF file, for example. The file format of the receipt display file is specified in the request data, and the server control unit 60 has a function for generating the receipt display data in the specified file format based on the receipt print data.

Next, the server control unit 60 controls the communication unit 61 to send the generated receipt display data to the terminal 14 (step SF10). In step SF10, the server control unit 60 sends the receipt display data through the connection opened with the terminal 14.

As shown in FIG. 4(C), the terminal application execution unit 50a of the terminal control unit 50 of the terminal 14 controls the data communication unit 53 to receive the receipt display data (step SE3).

Next, the terminal application execution unit 50a displays the receipt information based on the receipt display data on the display panel 51a of the touch panel 51 (step SE4).

The receipt information displayed based on the receipt display file corresponds to an electronic receipt.

As described above, the customer can receive an electronic receipt for a transaction without. In this embodiment, the POS terminal 8 communicates with the reading device 15 to acquire read information, and does not have a function for processing the read information that was acquired, but electronic receipts can be issued to customers by functions of the print control device 12 and the management server 10 without providing the POS terminal 8 with a function for producing electronic receipts.

Note that in the configuration described above the print control device 12, management server 10, and terminal 14 execute their respective processes after the customer completes a transaction, and the receipt display data is sent automatically from the management server 10 to the terminal 14. Alternatively, the management server 10 may provide the customer with an electronic receipt at a desired time based on a customer request after completing the transaction. More specifically, the customer may send member information to the management server 10 at a desired time by a specific means. The management server 10 generates and sends the receipt display data based on the received member information.

The management server 10 may also generate and send data other than receipt display data to the terminal 14 based on the receipt print data. For example, coupon display data for displaying coupon information reflecting the customer's transaction may be generated and sent to the terminal 14 based on the receipt print data.

As described above, the POS system 1 according to this embodiment of the invention includes a reading device 15, a POS terminal 8, and a print control device 12.

The reading device 15 reads and sends member information (identification information).

The POS terminal 8 executes a payment process and sends receipt print data (printing information) based on the payment process.

The print control device 12 includes a device communication unit 39 (first reception unit) that receives member information; a communication interface 35 (second reception unit) that receives receipt print data; a storage unit 38 that stores the member information received by the device communication unit 39; and a network communication unit 37 (transmission unit) that transmits first data (data) related to the member information and the receipt print data.

Thus comprised, the print control device 12 that communicates with the POS terminal 8 receives member information from the reading device 15 and executes a process. As a result, the POS system 1 can execute a process based on member information read by the reading device 15 without providing the POS terminal 8 with a function for communicating with the reading device 15 and processing member information.

The POS system 1 according to this embodiment also has a management server 10 (management device). The management server 10 has a communication unit 61 that receives the first data sent by the network communication unit 37 of the print control device 12, and a server control unit 60 (control unit) that processes the first data received by the communication unit 61.

Thus comprised, the management server 10 can execute a process using the member information and receipt print data based on the received first data.

The print control device 12 in this embodiment also has a device communication unit 39 that receives a signal (specific signal) indicating cancellation information; and a device control unit 30 that functions as an identification information process unit that deletes member information stored in the storage unit 38 when a signal indicating the cancellation information is received by the device communication unit 39.

Thus comprised, member information stored in the print control device 12 can be deleted and transmission of member information by the print control device 12 can be cancelled by sending the cancellation information signal to the print control device 12.

In this embodiment of the invention the reading device 15 transmits a signal representing member information.

Thus comprised, member information stored in the print control device 12 can be deleted and transmission of member information by the print control device 12 can be cancelled by sending the cancellation information signal from the reading device 15 to the print control device 12.

In this embodiment of the invention the print control device 12 has a print unit 31 that prints based on the receipt print data.

It is therefore sufficient to add a function for communicating with the reading device 15 and processing member information to the print control device 12, which is a device that prints based on receipt print data, and there is no need to add a dedicated device with this function to the POS system 1.

The print control device 12 in this embodiment of the invention has a signal communication unit 36 (signal transmission unit) that transmits a beacon signal (wireless signal) based on receiving receipt print data. The POS system 1 includes a terminal 14 that receives the beacon signal sent by the signal communication unit 36 of the print control device 12.

Thus comprised, the terminal 14 can execute a specific process triggered by receiving the beacon signal.

The invention is described above with reference to a preferred embodiment thereof, but the invention is not limited thereto and can be modified and adapted in many ways without departing from the scope of the accompanying claims.

For example, the print control device 12 in the foregoing embodiment has a print function. However, the print control device 12 does not necessarily need to have a print function. For example, the print control device 12 may be a relay device that connects to a printing device with a print function and passes data between the POS terminal 8 and the printing device.

The reading device 15 in the foregoing embodiment is an IC card reader. However, the reading device 15 may be a device with a different reading function, such as a reading device that reads codes (such as linear and two-dimensional barcodes) optically.

The print control device 12 is also described above as a thermal printer, but the printing method is not limited to thermal printing.

The function blocks in FIG. 2 also do not suggest any specific hardware configuration. The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A POS system comprising:
a reading device configured to read and transmit identification information;
a POS terminal configured to execute a transaction process and transmit print information based on the transaction process; and
a print device including:
a first communication interface configured to communicate with the reading device and to receive the identification information from the reading device;
a second communication interface configured to communicate with the POS terminal and to receive the print information from the POS terminal;
a storage configured to store the identification information received by the first communication interface;
a network communication interface;
a signal communication interface;
a device controller configured to (i) cause the network communication interface to transmit the identification information and the print information to a management server, (ii) subsequently receive a registration report from the management server indicating creation of a record based on the identification information and the print information, and (iii) after receiving the registration report, cause the signal communication unit to send a beacon signal to a user terminal; and
a printer configured to print based on the print information.

2. The POS system described in claim 1, further comprising:
a management device including:
a management device interface configured to receive the data transmitted by the network communication interface of the print device, and
a management device controller configured to execute a process based on the data received by the management device interface.

3. The POS system described in claim 2, wherein:
the identification information is stored in a member card, the member card being read by the reading device,
if the member card is read within a specific time, the identification information is transferred to the print device and the management device sends electronic receipt based on the print information to a terminal, and
if the member card is read within a specific time, the printer prints a paper receipt based on the print information.

4. The POS system described in claim 3, wherein:
the specific time is a time between a state when the storage does not store any identification information and a state when the second communication interface receives the print information from the POS terminal.

5. The POS system described in claim 1, wherein:
the device controller is configured to receive a specific signal, and delete the identification information stored in the storage when the specific signal is received.

6. The POS system described in claim 5, wherein:
the reading device is configured to transmit the specific signal; and
the first communication interface of the print device is configured to receive the specific signal.

7. The POS system described in claim 5, wherein:
the specific signal is a cancellation information stored in a cancellation card, the cancellation card being read by the reading device.

8. The POS system described in claim 1, further comprising:
said user terminal.

9. The POS system described in claim 1, wherein:
the identification information is stored in a member card, the member card being read by the reading device, the identification information being transferred to the print device if the member card is read within a specific time.

10. A print device comprising:
a first communication interface configured to communicate with a reading device and to receive identification information from the reading device;
a second communication interface configured to communicate with a POS terminal and to receive print information from the POS terminal;
a storage configured to store the identification information received by the first communication interface;
a network communication interface;
a signal communication interface;
a device controller configured to (i) cause the network communication interface to transmit the identification information and the print information to a management server, (ii) subsequently receive a registration report from the management server indicating creation of a record based on the identification information and the print information, and (iii) after receiving the registration report, cause the signal communication unit to send a beacon signal to a user terminal; and
a printer configured to print based on the print information.

11. The print device described in claim 10, wherein the device controller is configured to receive a specific signal, and delete the identification information stored in the storage when the specific signal is received.

12. The print device described in claim 11, wherein:
the first communication interface is configured to receive the specific signal.

13. The print device described in claim 11, wherein:
the specific signal is a cancellation information stored in a cancellation card, the cancellation card being read by the reading device.

14. The print device described in claim 10, wherein:
the identification information is stored in a member card, the member card being read by the reading device, the identification information being transferred to the first communication interface if the member card is read within a specific time.

15. The print device described in claim 10, wherein:
the identification information is stored in a member card, the member card being read by the reading device,
if the member card is read within a specific time, the identification information being transferred from the member card to the first communication interface and an electronic receipt based on the print information is sent to a terminal, and
if the member card is not read within the specific time, the printer prints a paper receipt based on the print information.

16. The print device described in claim 15, wherein:
the specific time is a time between a state when the storage does not store any identification information and a state when the second communication interface receives the print information from the POS terminal.

* * * * *